(12) United States Patent
Onishi et al.

(10) Patent No.: US 7,517,583 B2
(45) Date of Patent: Apr. 14, 2009

(54) LAMINATED GLASS

(75) Inventors: Tadashi Onishi, Mie (JP); Isao Nakamura, Mie (JP); Chiharu Takimoto, Mie (JP)

(73) Assignee: Central Glass Company, Limited, Ube-shi (JP)

( * ) Notice: Subject to any disclaimer, the term of this patent is extended or adjusted under 35 U.S.C. 154(b) by 0 days.

(21) Appl. No.: 10/572,321

(22) PCT Filed: Sep. 15, 2004

(86) PCT No.: PCT/JP2004/013406

§ 371 (c)(1),
(2), (4) Date: Mar. 17, 2006

(87) PCT Pub. No.: WO2005/028393

PCT Pub. Date: Mar. 31, 2005

(65) Prior Publication Data

US 2007/0026210 A1 Feb. 1, 2007

(30) Foreign Application Priority Data

Sep. 17, 2003 (JP) ............... 2003-325046
Sep. 17, 2003 (JP) ............... 2003-325047

(51) Int. Cl.
*B32B 5/16* (2006.01)
*B32B 17/10* (2006.01)
(52) U.S. Cl. ............ 428/328; 428/329; 428/331; 428/432; 428/436; 428/437; 428/697; 428/698; 428/699; 428/701; 428/702; 428/704
(58) Field of Classification Search ........ 428/437, 428/432, 328, 329, 331, 436, 697, 698, 699, 428/701, 702, 704
See application file for complete search history.

(56) References Cited

U.S. PATENT DOCUMENTS 5,336,565 A * 8/1994 Muromachi et al. ......... 428/432

(Continued)

FOREIGN PATENT DOCUMENTS

JP 2-177601 A 7/1990

(Continued)

OTHER PUBLICATIONS

Machine Translation of JP 2002220262 (Aug. 9, 2002).*

(Continued)

*Primary Examiner*—D. S Nakarani
(74) *Attorney, Agent, or Firm*—Crowell & Moring LLP

(57) ABSTRACT

The present invention relates to a laminated glass having an interlayer film between at least two transparent glass platy bodies. Functional ultra-fine particles of a particle diameter of not greater than 0.2 μm are dispersed in the interlayer film. The functional ultra-fine particles comprise a single substance of metal, oxide, nitride, sulfide or Sb- or F-doped substance of Sn, Ti, Si, Zn, Zr, Fe, Al, Cr, Co, Ce, In, Ni, Ag, Cu, Pt, Mn, Ta, W, V and Mo, or a composite selected from at least two of these, or a mixture containing an organic resin substance in the single substance or composite, or a coated substance coated with the single substance or composite, or an antimony-doped tin oxide and/or tin-doped indium oxide. An infrared-reflective film that selectively reflects a near-infrared ray and has a sheet resistivity ranging from 1 kΩ/□ to 10 GΩ/□ is formed on at least one surface of the interlayer film or at least one transparent glass platy body.

4 Claims, 1 Drawing Sheet

U.S. PATENT DOCUMENTS

| | | | |
|---|---|---|---|
| 5,631,315 A * | 5/1997 | D'Errico | 524/314 |
| 5,830,568 A * | 11/1998 | Kondo | 428/328 |
| 5,925,453 A | 7/1999 | Kase et al. | |
| 6,911,254 B2 * | 6/2005 | Fisher et al. | 428/328 |
| 2002/0086926 A1 | 7/2002 | Fisher | |
| 2003/0054160 A1 | 3/2003 | Fisher et al. | |
| 2003/0139520 A1 * | 7/2003 | Toyama et al. | 524/503 |

FOREIGN PATENT DOCUMENTS

| | | |
|---|---|---|
| JP | 6-92688 A | 4/1994 |
| JP | 6-144874 A | 5/1994 |
| JP | 7-24957 A | 1/1995 |
| JP | 2002-220262 A | 8/2002 |
| JP | 2004-26647 A | 1/2004 |
| WO | WO 04/000549 A1 | 12/2003 |

OTHER PUBLICATIONS

International Search Report dated Oct. 26, 2004 (Three (3) pages).

European Search Report dated May 11, 2007 (Three (3) Pages).

* cited by examiner

LAMINATED GLASS

TECHNICAL FIELD

The present invention relates to laminated glasses that are used for vehicular window glasses, architectural window glasses and the like and that are superior in infrared ray (heat ray) reflection and radio wave transmission.

BACKGROUND OF THE INVENTION

In recent years, there have been used a heat-insulating glass with heat ray (infrared ray) insulation in architectural glasses or vehicular glasses, for the purpose of shielding solar radiant energy passing into the room interior or vehicle interior and reducing the temperature increase of the room interior or vehicle interior and cooling load, and one with ultraviolet ray shield in vehicular glasses for making it mild to human and material sides and environment.

In particular, there have recently been patent applications relating to heat-insulating laminated glasses in which conductive ultra-fine particles are dispersed in an interlayer film for laminated glasses, since they are superior in the above-mentioned heat insulation and ultraviolet ray shield together with visible light ray transmission, radio wave transmission and the like.

For example, Patent Publication 1 discloses, in a laminated glass having an interlayer film between two transparent glass platy bodies, a laminated glass in which fine particles of not greater than 0.2 µm having functions of conductivity and the like are dispersed in the interlayer film. Patent Publication 2 discloses, in a laminated glass formed of a pair of glasses and a soft resin provided between the glasses, a laminated glass in which the soft resin contains a heat-ray shielding metal oxide.

Furthermore, Patent Publication 3 discloses, in a laminated glass having three-layered interlayer film between at least two transparent glass plate bodies, a laminated glass in which functional ultra-fine particles of not greater than 0.2 µm are dispersed in the second interlayer film of the three layers. Patent Publication 4 discloses a process for producing a transparent resin molded body, which is characterized in that a plasticizer, in which a heat-ray shielding inorganic compound of a particle diameter of not greater than 0.1 µm is dispersed, is added to a transparent resin, and this transparent resin is molded.

Of the sunlight rays, an infrared ray having a wavelength of not less than 780 nm (particularly a near infrared ray of a wavelength of 780 nm to 2100 nm) is called heat-ray (infrared ray), since it has a great thermal action, and, when it is absorbed by an object, it is emitted as heat to bring about the temperature increase. It is known that, if infrared rays coming in through a window glass are shielded, heat insulation can be improved by suppressing the temperature increase of a vehicle or architecture.

Patent Publication 1: Japanese Patent Laid-open Publication 8-259279
Patent Publication 2: Japanese Patent Laid-open Publication 8-217500
Patent Publication 3: Japanese Patent Laid-open Publication 10-297945
Patent Publication 4: Japanese Patent 3040681

SUMMARY OF THE INVENTION

It is an object of the present invention to provide a laminated glass that transmits radio waves and has a high heat-ray shielding capacity.

According to the present invention, in a laminated glass having an interlayer film between at least two transparent glass platy bodies, there is provided a laminated glass characterized in that functional ultra-fine particles of a particle diameter of not greater than 0.2 µm are dispersed in the interlayer film, that the functional ultra-fine particles comprise a single substance of metal, oxide, nitride, sulfide or Sb- or F-doped substance of Sn, Ti, Si, Zn, Zr, Fe, Al, Cr, Co, Ce, In, Ni, Ag, Cu, Pt, Mn, Ta, W, V and Mo, or a composite selected from at least two of these, or a mixture containing an organic resin substance in the single substance or composite, or a coated substance coated with the single substance or composite, or an antimony-doped tin oxide and/or tin-doped indium oxide, and that an infrared-reflective film that selectively reflects a near-infrared ray and has a sheet resistivity ranging from 1 kΩ/□ to 10 GΩ/□ is formed on at least one surface of the interlayer film.

Furthermore, according to the present invention, in a laminated glass having an interlayer film between at least two transparent glass platy bodies, there is provided a laminated glass characterized in that an infrared-reflective film that selectively reflects a near-infrared ray and has a sheet resistivity ranging from 1 kΩ/□ to 10 GΩ/□ is formed on at least one transparent glass platy body constituting the laminated glass, and that functional ultra-fine particles of a particle diameter of not greater than 0.2 µm are dispersed in the interlayer film, that the functional ultra-fine particles comprise a single substance of metal, oxide, nitride, sulfide or Sb- or F-doped substance of Sn, Ti, Si, Zn, Zr, Fe, Al, Cr, Co, Ce, In, Ni, Ag, Cu, Pt, Mn, Ta, W, V and Mo, or a composite selected from at least two of these, or a mixture containing an organic resin substance in the single substance or composite, or a coated substance coated with the single substance or composite, or an antimony-doped tin oxide and/or tin-doped indium oxide.

DETAILED DESCRIPTION

Figure 1:
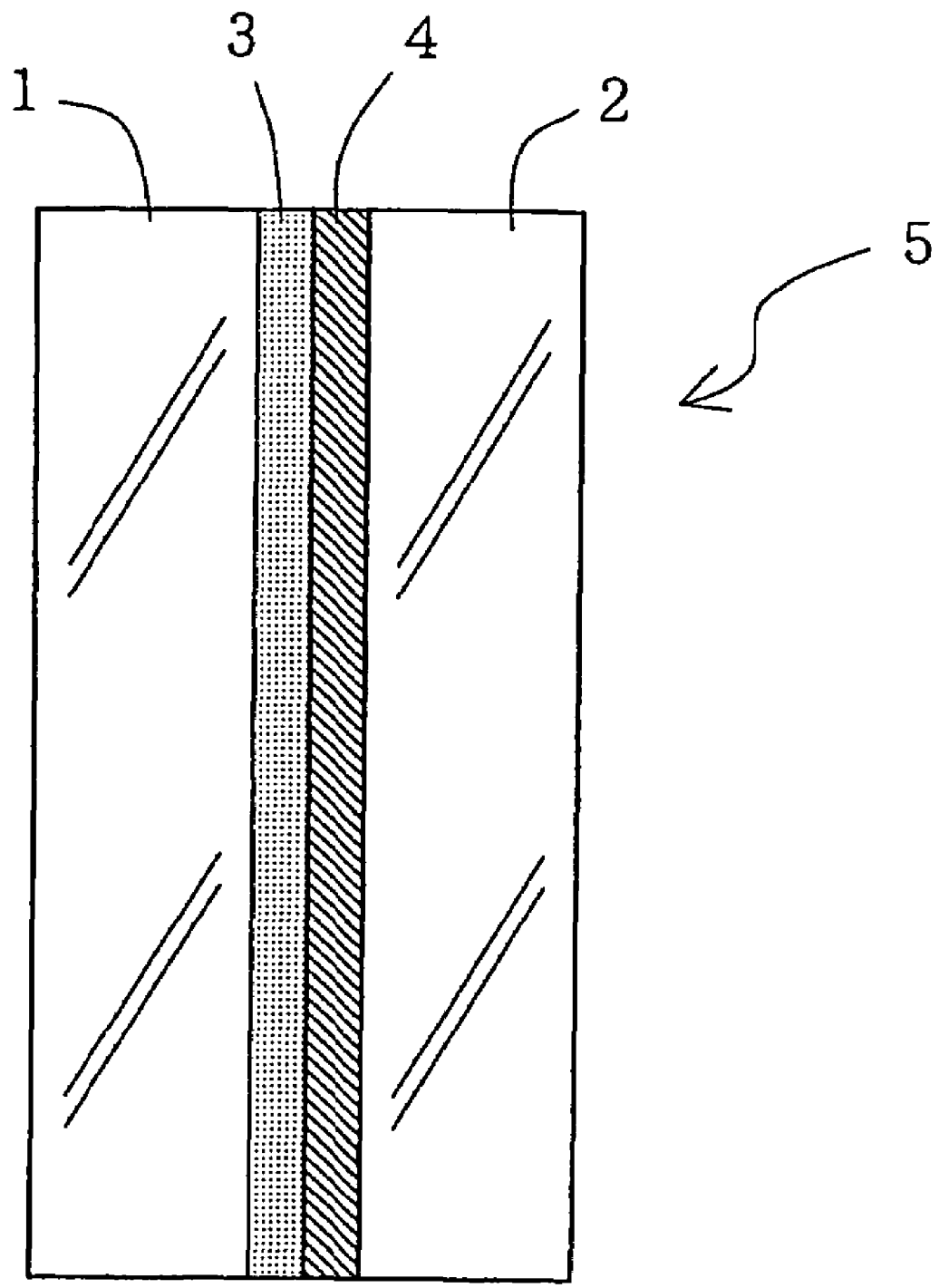
FIG. 1 is a sectional view of an exemplary laminated glass of the present invention.

The present invention can provide a very high performance, heat-insulating glass having a radio wave transmission capability by using an interlayer film (hereinafter referred to as functional laminating interlayer film) in which conductive ultra-fine particles are dispersed in the laminating interlayer film and furthermore by forming an infrared reflective film that selectively reflects wavelength of a particular region of infrared rays on the functional laminating interlayer film. That is, the present invention can provide a laminated glass (high heat-insulating laminated glass) that transmits radio waves and has a high heat-ray insulating capability.

The high heat-insulating laminated glass according to the present invention has a radio-wave transmission capability, can reduce radio disturbance in broadcasts such as AM radio waves, FM radio waves, and TV radio waves, and has a radio-wave transmission capability comparable with that of float glass. Therefore, the receiving capability of glass antenna for vehicular television, radio, cellular phone and the like is not lowered, or it is possible to reduce radio disturbance such as ghost phenomena. Thus, it is possible to achieve the original glass antenna performance and obtain a comfortable environment inside and outside of a vehicle.

Furthermore, it can be used as a laminated glass of glass and glass, glass and synthetic resin plate, bilayer and the like.

The color tone can also be selected from colorless to various color tones. It is possible to provide a window glass used for an opening of architecture, automobile or airplane or the like, with a radio-wave transmissive type, high heat-insulating laminated glass.

In the following, a laminated glass of the present invention is exemplarily described in detail.

The present invention provides a laminated glass in which at least two transparent glass platy bodies are laminated together using a functional laminating interlayer film in which functional ultra-fine particles are dispersed. Furthermore, it is one in which an infrared reflective film having radio-wave transmissive capability is formed on at least one surface of the interlayer film or the transparent glass platy body. FIG. 1 shows an easy constitutional example of a laminated glass of the present invention. An infrared reflective film 4 is formed on a transparent glass platy body 2 or functional laminating interlayer film 3.

The reason why the particle diameter of the functional ultra-fine particles to be dispersed in the interlayer is adjusted to not greater than 0.2 μm is to maintain super low haze value, radio-wave transmissive capability and transparency, while sufficiently achieving functional characteristics of the ultra-fine particles such as infrared ray (heat ray) insulation under suppression of visible light region scattering reflection, to maintain properties such as adhesion, transparency and durability as a conventional laminating interlayer film even though the ultra-fine particles are contained, and to make it possible to conduct a treatment for producing a laminated glass by a normal operation of a normal laminated glass production line.

The particle diameter is preferably not greater than 0.15 μm, more preferably about 0.10-0.001 μm. Regarding the particle diameter distribution range, a uniform one such as 0.03-0.01 μm is preferable.

Furthermore, it is preferable that the mixing ratio of the functional ultra-fine particles to the laminating interlayer is not greater than 10.0 wt %. By making it not greater than 10.0 wt %, similar to the particle diameter of the ultra-fine particles, it is possible to sufficiently achieve functional characteristics of insulating heat ray under suppression of visible light region scattering reflection. Furthermore, it is possible to make it have super low haze value, radio-wave transmissive capability and transparency. Furthermore, it is possible to maintain properties such as adhesion, transparency and durability as a conventional laminating interlayer film even though the ultra-fine particles are contained and to make it possible to conduct a laminated glass production treatment by a normal operation of a normal laminated glass production line.

If the mixing ratio of the functional ultra-fine particles exceeds 10.0 wt %, it becomes difficult to achieve transparency, radio-wave transmission, adhesion and the like particularly as architectural window glass as well as automotive window glass. For example, in the case of architectural, high heat-insulating, laminated glasses, the mixing ratio is necessarily 10-0.1 wt %, more preferably 8.0-0.05 wt %. In the case of automotive use, a preferable mixing ratio is about 2.0-0.01 wt %, more preferably 1.5-0.05 wt %, more preferably 1.0-0.1 wt %. Anyway, it is desirable to suitably determine the mixing ratio (the content) by the balance between the performance maintenance as a laminated glass and the target functional performance.

As a resin used for the functional laminating interlayer, it is possible to use a polyvinyl butyral resin film (PVB based) or ethylene-vinyl acetate copolymer resin film (EVA based). These are preferable since they are generally used as laminated interlayer films. They are not particularly limited, as long as they are laminating interlayer films that are capable of adjusting qualities as laminated glasses to needs. Specifically, they are plastic PVB [made by Sekisui Chemical Co., Ltd. and made by Mitsubishi Monsant Company], EVA [made by Du Pont Company and Takeda Pharmaceutical Company Limited; DURAMINE], modified EVA [made by Tosoh Corporation; Melthene-G] and the like. Furthermore, there are suitably added and mixed ultraviolet absorbing agent, antioxidant, antistatic agent, heat stabilization agent, lubricant, filler, coloring, bond adjusting agent, and the like. In particular, it is more preferable to add ultraviolet absorbing agent to the resin for the laminating interlayer film, since ultraviolet rays together with infrared rays can also be cut. Thus, it becomes mild to human and material sides and environment.

A laminating interlayer film may be constructed, for example, by laminating together an ultra-fine particles-contained, functional, laminating interlayer film and a conventional laminating interlayer film or by sandwiching an ultra-fine particles-contained, functional, laminating interlayer film between conventional laminating interlayer films.

As the functional ultra-fine particles, it is desirable to select a single substance of metal, oxide, nitride, sulfide or Sb- or F-doped substance of Sn, Ti, Si, Zn, Zr, Fe, Al, Cr, Co, Ce, In, Ni, Ag, Cu, Pt, Mn, Ta, W, V and Mo, or a composite selected from at least two of these, or a mixture containing an organic resin substance in the single substance or composite, or a coated substance coated with the single substance or composite, or to use conductive ultra-fine particles such as an antimony-doped tin oxide and/or tin-doped indium oxide.

In particular, tin-doped indium oxide (ITO) and antimony-doped tin oxide (ATO), which are transparent to visible light region and highly reflective to the infrared region light, are particularly preferable, since they achieve as a laminated glass various functions and performances that are required of architectural use and automotive use.

In the case of a PVB (polyvinyl butyral) based or EVA (ethylene-vinyl acetate copolymer) based laminating interlayer film, it is possible to uniformly disperse functional ultra-fine particles in a plasticizer solution by dispersing the functional ultra-fine particles in a plasticizer to prepare an ultra-fine particle-dispersed plasticizer, then by adding the ultra-fine particle-dispersed plasticizer into a PVB-based or EVA-based resin solution, then suitably adding other additives, and then mixing and kneading to obtain it from a film-use raw material resin.

As the plasticizer, there are cited phthalic acid esters such as dioctyl phthalate (DOP), diisodecyl phthalate (DIDP), ditridecyl phthalate (DTDP) and butylbenzyl phthalate (BBP); phosphoric acid esters such as tricresyl phosphate (TCP) and trioctyl phosphate (TOP); fatty acid esters such as tributyl citrate and methylacetyl ricinolate (MAR); polyether esters such as triethyleneglycol-di-2-ethylbutylate (3GH) and tetraethyleneglycoldihexanol; and mixtures of these.

As an organic ultraviolet-ray-absorbing agent, there are cited benzotriazole derivatives such as 2-(2'-hydroxy-5'-methylphenyl)benzotriazole, 2-(2'-hydroxy-3',5'-ditert-butylphenyl)benzotriazole, 2-(2'-hydroxy-3'-tert-butyl-5'-methylphenyl)-5-chlorobenzotriazole, 2-(2'-hydroxy-3',5'-ditert-butylphenyl)-5-chlorobenzotriazole and 2-(2'-hydroxy-3',5'-ditert-amylphenyl)benzotriazole;

benzophenone derivatives such as 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4, 4'-dimethoxybenzophenone and 2-hydroxy-4-methoxy-5-sulfobenzophenone; cyanoacrylate derivatives such as 2-ethylhexyl-2-cyano-3,3'-diphenylacrylate and ethyl-2-cyano-3, 3'-diphenylacrylate; and the like. Specifically, they are, for example, TINUVIN327 [made by Ciba-Geigy Co.] and the like.

As an organic infrared-ray absorbing agent, for example, NIR-AM1 [made by Teikoku Chemical Industries, Ltd.] is cited. In particular, as a near-infrared ray absorbing agent, there are cited SIR-114, SIR-128, SIR-130, SIR-132, SIR-169, SIR-103, PA-1001 and PA-1005 [made by Mitsui Toatsu Chemical Co.]. In particular, it is needless to say that they can be used without limitation as long as they maintain and achieve laminated glass quality that is required of architectural use and automotive use.

It is also possible to use fine particles of organic resins such as fluororesin such as PTFE, silicone resin, and silicone rubber. These can suitably be used for reducing adhesion strength between PVB interlayer film and transparent substrate such as glass. In other words, ultra-fine particles of metal oxide such as ATO and ITO may provide an adhesion strength that is greater than standard. Therefore, they can be used for suitably making Pammel value, which is an evaluation standard of adhesion strength of laminated glass, be within the standard value, for a purpose similar to, for example, a primer coating on the glass substrate surface and a coated substance coated with the fluororesin, silicone resin, silicone rubber or the like.

An infrared ray reflective film is formed on a transparent glass platy body or interlayer film. As the infrared ray reflective film, it is possible to use a film that selectively absorbs or reflects wavelengths of a particular region of infrared rays.

It is desirable to make the absorption or reflection wavelength region different from the infrared ray wavelength region to be shielded by the functional laminating interlayer film, since the heat ray shielding performance is improved.

In case that an infrared ray reflective film is formed on a transparent glass platy body, it is preferable to make a laminated glass by lamination in a manner to dispose the formed infrared ray reflective film on the interlayer film side, since a weather resistance problem of the infrared ray reflective film can be cancelled.

Although it is not limited, it is possible to preferably use as an infrared reflective film a single layer or alternately laminated one of a metal of silicon of a refractive index of 4.00-5.00, stainless steel of a refractive index of 3.00-4.00, or chromium of a refractive index of 13.00-14.00; a nitride of silicon nitride of a refractive index of 1.50-2.50, chromium nitride of a refractive index of 1.50-2.50, titanium nitride of a refractive index of 0.50-1.50, stainless steel nitride of a refractive index of 2.00-3.00 or the like, or an oxide of silicon oxide of a refractive index of 1.20-2.50, titanium oxide, zinc oxide, tin oxide, tantalum oxide, ITO, chromium oxide of a refractive index of 0.10-1.00, stainless steel oxide, nichrome oxide or the like.

Metal and nitride films have conductivity and reflect radio waves depending on the film forming condition and the film thickness. Therefore, it is preferable to determine the film thickness and the film components in a manner not to reflect radio waves.

For example, as to a metal film of chromium, stainless steel or the like, it is preferable to make the film thickness not greater than 10 nm or to make oxygen or nitrogen of not greater than 10 wt % contained in the film. As to a nitride such as silicon nitride, chromium nitride, titanium nitride, or stainless nitride, it is preferable to make the film thickness not greater than 15 nm or to make oxygen of not greater than 5 wt % contained in the film.

The film forming process of these infrared ray reflective films is not particularly limited. When it is formed on the functional laminating interlayer film, a vacuum-related low-temperature film formation of vacuum deposition, sputtering, plasma CVD or the like is preferable.

It is preferable to form an infrared ray reflective film on the functional laminating interlayer film. It is, however, optional to form an infrared ray reflective film on a normal interlayer film in which functional fine particles are not dispersed and then laminate it with the functional laminating interlayer film. Upon this, the infrared ray reflective film may be positioned between the interlayer films or positioned on the glass surface.

As to the process of forming an infrared ray reflective film on an interlayer film, the film formation can be conducted as follows, for example, by sputtering.

A functional laminating interlayer film was rolled around a roll, and it was carried in a sputtering facility. Then, a film was formed by the following procedures using a sputtering apparatus. Firstly, a metal target required for the film formation is attached to a sputtering apparatus. Then, prior to the film formation, the inside of the sputtering apparatus is exhausted to have a degree of vacuum of about $10^{-3}$ Pa.

When it is formed on an interlayer film, which is different from the film formation on a glass plate or the like, it is necessary to strictly conduct the management of water or volatile matters, such as residual monomers, which generate from the interlayer film.

An interlayer film upon the film formation is fixed in a vacuum chamber, while tension is added thereto. The tension is always made constant, and it is fixed under a sufficient consideration of the surface flatness and the film expansion ratio.

An infrared ray reflective film may be formed on a transparent glass platy body, not on an interlayer film. It is preferable to make a laminated glass by lamination in a manner to dispose the formed infrared ray reflective film on the interlayer film side, since a weather resistance problem of the infrared ray reflective film can be cancelled.

The transparent glass platy body is an inorganic glass, organic glass or composite glass of these, particularly an inorganic, transparent, clear to colored glass produced by so-called float method, tempered glass or its analogous glass, or a glass with a coated film such as primer and various functional films. Preferably, for example, it is a green glass or bronze glass. Furthermore, for example, it is possible to use gray glass, blue glass and the like.

Needless to say, it can be used as laminated glass, double glazing, bilayer glass or the like and furthermore as various plate glass products such as flat plate or curved plate.

The plate thickness of the transparent glass platy body is, for example, 1.0 mm to 12 mm. For architectural use, it is preferably 2.0 mm to 10 mm. For automotive use, it is preferably 1.5 mm to 3.0 mm, more preferably 2.0 mm to 2.5 mm.

A laminated glass of the present invention can be used for various architectural window glasses and the like. In particular, it can be used as an automotive window glass, for example, front glass, rear glass, particularly rear glass with shade band, side glass or sunroof glass, or other various glasses.

Regarding the optical properties of a laminated glass of the present invention, the visible light ray transmittance (wavelength: 380-780 nm) is preferably not less than 65%, and the solar radiation transmittance (wavelength: 300-2100 nm) is preferably not greater than 65%, when converted to the case in which clear glasses (FL2) are used as the two opposed glass substrates. In particular, in the case of automotive window glass, it is more preferable that the visible light ray transmittance is not less than 70% and that the solar radiation transmittance is not greater than 60%. Furthermore, the solar radiation reflectance is preferably not less than 7.0%. By conversion to the case in which green glasses (MFL2) are used as two glass substrates, it is preferable that the visible light ray transmittance is not less than 70% and that the solar radiation transmittance is not greater than 60%, and it is more preferable that the solar radiation reflectance is not less than 7.0%.

In particular, as an automotive window glass, while the radio wave transmission performance is made to be equivalent to the radio wave transmission performance of a transparent glass platy body and while the infrared ray (heat ray) shielding performance is considerably improved to have a solar radiation transmittance of not greater than 50%, thereby further improving inhabitability, it is possible to secure transmission by having a visible light ray transmittance of not less than 65%, which is necessary in terms of security and the like for driver, passengers and the like, for example, a visible light ray transmittance of not less than 70% and to make it cleared by law. Furthermore, it is possible to further reduce the visible light reflectance, which is necessary for preventing the transmission reduction for the driver, passenger and the like, misperception or eye fatigue, from conventional values. Thus, it is possible to obtain an optimum radio wave transmissive type, high heat insulation laminated glass. For automotive use, it is preferable that the visible light transmittance is not less than 68-70%, the visible light reflectance is not greater than 14%, and the solar radiation transmittance is not greater than 60%. For architectural use, it is preferable that the visible light transmittance is not less than 30%, the visible light reflectance is not greater than 20%, and the solar radiation transmittance is not greater than 65%.

It is preferable that the sheet resistivity of the infrared ray reflective film is in a range of 500 Ω/□ to 10 GΩ/□ for transmitting radio waves. It is preferably in a range of 1 kΩ/□ to 10 GΩ/□ for sufficiently transmitting radio waves.

In case that it is used as an automotive glass such as automotive front glass, rear glass or side glass or the like, it is preferably not less than 20 kΩ/□. In case that the glass is provided with a communication antenna, it is preferably not less than 10 MΩ/□.

In case that it is used as an architectural window glass, it is desirable that the sheet resistivity of the infrared ray reflective film is not less than 1 kΩ/□ for preventing occurrence of radio disturbance such as radio disturbance in broadcasts such as AM radio waves and FM radio waves or ghost phenomena in TV image.

It is possible to prepare a laminated glass of the present invention by a process similar to that of laminated glasses normally used for automobile and architecture, that is, a lamination process through autoclave method by increasing the temperature from ordinary temperature to 120° C. under reduced pressure and then heating it in a temperature range of 80-120° C. for 20-30 minutes.

In the following, the present invention is specifically explained by examples. The present invention is, however, not limited by examples.

EXAMPLE 1

(1) Preparation of Functional Laminating Interlayer Film 10 g of BBP (butyl benzyl phthalate), in which 20wt % of ITO ultra-fine particles (particle diameter: 0.02 μm or less) had been dispersed and contained, and 90 g of normal BBP were added to 322 g of PVB (polyvinyl butyral). Together with other ultraviolet ray absorbing agent and the like, it was kneaded with a three-roll mixer at about 70° C. for about 15 minutes for mixing. The obtained film-forming, raw material resin was formed into a film with an extruder at about 190° C. to have a thickness of about 0.8 mm, followed by winding about a roll, thereby preparing a functional laminating interlayer film. Furthermore, uniform uneven crimps were formed on the film surface.

(2) Film Formation of Infrared Reflective Film on Transparent Glass Platy Body

As the transparent glass platy body, there was used a transparent plate glass that had a plate thickness of 2 mm and had been produced by float method. The plate glass was washed with neutral detergent and pure water, and then an infrared ray reflective film was formed by the following procedures using a sputtering apparatus. Firstly, a metal target necessary for the film formation was attached to the sputtering apparatus. Then, prior to the film formation, the inside of the sputtering apparatus was exhausted until the degree of vacuum reaches about $10^{-3}$ Pa. The present process is such that a conveyer roll is installed below the target in a vacuum chamber and that predetermined metal film, nitride film and oxide are formed on the glass plate from the target, to which electric power is applied, when the glass substrate moves reciprocatingly on the conveyer roll. As a first pass, the atmosphere of the film forming chamber was maintained to have an oxidative atmosphere ($O_2$:Ar=95:5), and a film of ZnO was formed 14 nm as a first layer of a first layer dielectric layer from Zn target. As a second pass, the atmosphere of the film forming chamber was maintained to have an argon atmosphere (Ar=100), and a film of SST as a second layer was formed 8 nm by SST target. As a third pass, the atmosphere of the film forming chamber was maintained to have an oxidative atmosphere ($O_2$:Ar=95:5), and a film of ZnO was formed 14 nm as a third layer by Zn target. The glass after the film formation was taken out of the vacuum chamber.

(3) Preparation of Laminated Glass

Using the functional laminating interlayer film prepared in the above (1), a lamination process was conducted between the transparent glass platy body having a surface, on which the infrared ray reflective film had been formed by (2), and a plate glass of a thickness of 2 mm produced by float method, thereby preparing a laminated glass. As shown in FIG. 1, the infrared ray reflective film 4 was positioned on the side of the functional laminating interlayer film 3.

The preparation of the laminated glass was conducted, as follows.

The transparent glass platy body 1 formed with the infrared ray reflective film and the functional laminating interlayer film 3 were laminated together. Then, a transparent glass platy body 2 was placed on the functional laminating interlayer film. Furthermore, the functional laminating interlayer film 3 projecting from the edge of the transparent glass platy bodies 1, 2 was cut along the edge. Then, the laminated transparent glass platy body 5 was put into a rubber vacuum bag, and then the inside of the bag was deaerated and depressurized. After maintaining it at 80-110° C. for 20-30 minutes, it was made to have ordinary temperature. Then, it was taken out of the bag and put into an autoclave apparatus. Then, a laminating process was conducted by pressurization and heating at a pressure of about 10-14 kg/cm² and a temperature of 110-140° C. for 20 minutes, thereby preparing a laminated glass of the present invention.

The prepared laminated glass was subjected to the following measurements and evaluations.

[Optical Characteristics]: Transmittance of wavelengths of 300-2100 nm was measured by a spectrophotometer (340 type automated, made by Hitachi Ltd.). The visible light ray transmittance, the visible light ray reflectance (380-780 nm, D65 light source), the solar radiation transmittance, and the solar radiation reflectance (300-2100 nm) were determined by JIS Z 8722 and JIS R 3106 or JIS Z 8701.

[Radio Wave Transmittance]: By KEC method measurement (electric field shielding effect measuring device), the reflection loss value (dB) of a range of 10-1000 MHz of radio waves was compared with that of a normal clear glass (FL3) single plate product of a plate thickness of 3 mm. The absolute value (ΔdB) of the difference therebetween was judged as being satisfactory, when it was 2 dB or less.

[Adhesion]: After it was allowed to stand still at a temperature of −18±0.6° C. for 16±4 hours, the degree of exposure of the laminating interlayer film upon exfoliation of the glass by hammer hitting was evaluated. One with less exposure was judged as being satisfactory.

[Heat Resistance]: After boiling in boiling water of 100° C. for 2 hours, one free from abnormalities such as occurrence of bubbles, fogging and glass cracks in the remaining part except the peripheral 10 mm was judged as being satisfactory.

[Humidity Resistance]: After it was allowed to stand still for two weeks under an adjustment of 50±2° C. and a relative humidity of 95±4° C., one free from abnormalities such as occurrence of bubbles, fogging and glass cracks was judged as being satisfactory.

[Electric Characteristics]: A measurement was conducted with a high resistivity meter made by Mitsubishi Petrochemical Co., Ltd. (HIRESTA HT-210). A sheet resistivity value (MΩ/□) of not less than 0.02 MΩ/□ was judged as being satisfactory.

The evaluations of adhesion, heat resistance and humidity resistance were conducted in accordance with JIS R 3212 safety glass.

As shown in Table 2, it was found by the evaluation results to have a visible light ray transmittance of 74.8%, a visible light ray reflectance of 11.0%, a solar radiation transmittance of 59.1%, and a solar radiation reflectance of 8.8%.

There was obtained an infrared ray shielding, heat insulating laminated glass of high visible light ray transmittance and low solar radiation transmittance. As compared with the aftermentioned Comparative Example 1 having the same glass composition, the glass of Example 1 maintains a visible light ray transmittance of not less than 65% and is improved by about 9.0% in solar radiation transmittance. It is thus understood that the effect of the infrared ray reflective film is large.

Regarding the radio wave transmission, the resistance value of the infrared ray reflective film was as very high as 0.2 MΩ/□, and it showed a radio wave transmission comparable to that of an ordinary single plate glass.

Furthermore, adhesion, heat resistance and humidity resistance were equivalent to those of an ordinary laminated glass.

EXAMPLE 2 to EXAMPLE 11

In Example 2 to Example 11, laminated glasses were prepared in the same manner as that of Example 1, except in that only the infrared ray reflective film formed on the transparent platy body was different from that of Example 1.

Each layer constituting the infrared ray reflective film of each example was formed by the same process as that of Example 1 under target metal, gas composition, electric power and pressure conditions shown in Table 1.

As a result of evaluation of the obtained high heat-insulation laminated glass, as shown in Table 2, each laminated glass obtained in Example 2 to Example 11 was lower than Comparative Example 1 in solar radiation transmittance and superior in infrared ray shielding heat-insulating performance. The sheet resistivity of the infrared ray reflective film of each example was high, and radio wave transmission was good.

Laminated glass performances such as adhesion, heat resistance and humidity resistance were all satisfactory, similar to Example 1.

EXAMPLE 12 to EXAMPLE 22

In Examples 12-22, an infrared ray reflective film was formed on a functional laminating interlayer film. Each layer constituting the infrared ray reflective film of each example was formed under target metal, gas composition, electric power and pressure conditions shown in Table 1.

In Example 12, an infrared ray reflective film was formed on a functional laminating interlayer film, as follows.

A functional laminating interlayer film was rolled around a roll, and it was carried in a sputtering facility. Then, a film was formed by the following procedures using a sputtering apparatus. Firstly, a metal target required for the film formation was attached to a sputtering apparatus. Then, prior to the film formation, the inside of the sputtering apparatus was exhausted to have a degree of vacuum of about $10^{-3}$ Pa.

A drum roll was installed below the target in the vacuum chamber. When a functional laminating interlayer film stretched to have a constant tension on the drum roll moves under a wound condition, a predetermined film was formed on the functional laminating interlayer film from the target, to which electric power was applied.

The film formation was conducted under a condition in which the gas atmosphere of the film forming chamber of each target was independent. In the first film forming chamber, the atmosphere of the film forming chamber was maintained to have an oxidative atmosphere ($O_2$:Ar=95:5), and a film of ZnO was formed 14 nm as a first layer by Zn target. In the next film forming chamber, the atmosphere of the film forming chamber was maintained to have an argon atmosphere (Ar=100), and a film of SST as a second layer was formed 8 nm by SST target. In the next film forming chamber, the atmosphere of the film forming chamber was maintained to have an oxidative atmosphere ($O_2$:Ar=95:5), and a film of ZnO was formed 14 nm as a third layer by Zn target. The functional laminating interlayer film after the film formation was rolled about a roll in vacuum.

In Example 13 to Example 22, similar to Example 12, an infrared ray reflective film having a film structure shown in Table 2, each layer constituting an infrared ray reflective film of each example, was formed on the functional laminating interlayer film under target metal, gas composition, electric power and pressure conditions shown in Table 1.

COMPARATIVE EXAMPLE 1

A laminated glass was prepared in the same manner as that of Example 1, except in that an infrared ray reflective film was not formed. As shown in Table 1, the evaluation results were such that the visible light ray transmittance was 87.9%, the visible light ray reflectance was 8.5%, the solar radiation transmittance was 68.1%, and the solar radiation reflectance was 5.7%.

COMPARATIVE EXAMPLE 2

A laminated glass was prepared in a manner similar to Example 1, using a film that is a so-called LOW-E using Ag film. As shown in Table 1, the results of the evaluation were such that the visible light ray transmittance was 74.9%, the visible light ray reflectance was 14.1%, the solar radiation transmittance was 52.0%, and the solar radiation reflectance was 27.5%. The solar radiation transmittance was lower than those of Example 1 to Example 11, resulting in superior heat insulating performance. The infrared ray reflective film had a sheet resistivity value of 7 Ω/□ and therefore had almost no radio transmission capability.

TABLE 1

| Target | | Gas Composition sccm Parenthesis inside is in % | | | Power | Degree of Vacuum |
|---|---|---|---|---|---|---|
| | Metal | Argon | Oxygen | Nitrogen | (kw) | (Pa) |
| TiO | Ti | 100(45) | 120(55) | | 45 | $2.5 \times 10^{-1}$ |
| TiN | | | 30(8) | 350(92) | 45 | $3.0 \times 10^{-1}$ |
| ZnO | Zn | 100(22) | 300(67) | 50(11) | 40 | $3.5 \times 10^{-1}$ |
| SnO | Sn | 100(50) | 50(25) | 50(25) | 25 | $2.5 \times 10^{-1}$ |
| Si | Si | 100(100) | | | 25 | $1.5 \times 10^{-1}$ |
| SiO | | 100(40) | 150(60) | | 25 | $2.5 \times 10^{-1}$ |
| $Si_3N_4$ | | 100(36) | | 180(64) | 25 | $2.5 \times 10^{-1}$ |
| SST | SST | 100(100) | | | 40 | $1.5 \times 10^{-1}$ |
| SSTN | | | | 100(100) | 40 | $2.5 \times 10^{-1}$ |
| SSTO | | 100(36) | 180(64) | | 30 | $2.5 \times 10^{-1}$ |
| CrN | Cr | | | 100(100) | 30 | $2.5 \times 10^{-1}$ |
| CrO | | 100(36) | 180(64) | | 30 | $2.5 \times 10^{-1}$ |
| NiCrO | NiCr | 100(36) | 180(64) | | 30 | $2.5 \times 10^{-1}$ |

TABLE 2

| | Infrared Ray Reflective Film Structure & Film Thickness (nm) | Film Resistance (MΩ/□) | Optical Characteristics (%) | | | |
|---|---|---|---|---|---|---|
| | | | Visible Light Ray | | Solar Radiation | |
| | | | Transmittance | Reflectance | Transmittance | Reflectance |
| Examples 1 &12 | G/ZnO(14)/SST(0.8)/ZnO(14) | 0.2 | 74.8 | 11.0 | 59.1 | 8.8 |
| Examples 2 &13 | G/ZnO(14)/SSTN(1.2)/ZnO(14) | 1.2 | 74.9 | 10.2 | 58.8 | 8.2 |
| Examples 3 &14 | G/ZnO(14)/CrN(1.4)/ZnO(14) | 2.4 | 74.4 | 9.6 | 59.9 | 7.9 |
| Examples 4 &15 | G/SnO(14)/CrN(1.4)/SnO(14) | 2.2 | 74.0 | 10.4 | 59.6 | 8.3 |
| Examples 5 &16 | G/SiO(30)/Si(2.2)/SiO(6.0) | 18 | 73.9 | 9.3 | 61.3 | 7.8 |
| Examples 6 &17 | G/CrO(30) | ∞ | 73.9 | 12.9 | 59.9 | 10.4 |
| Examples 7 &18 | G/NiCrO(20) | 98 | 74.2 | 11.3 | 60.3 | 9.1 |
| Examples 8 &19 | G/SSTO(34) | 80 | 74.1 | 9.8 | 60.1 | 8.2 |
| Examples 9 &20 | G/TiN(8)/TiO(4)/Si3N4(4) | 0.2 | 73.0 | 7.8 | 54.8 | 7.5 |
| Examples 10 &21 | G/ZnO(14)/TiN(8)/ZnO(4) | 0.2 | 72.9 | 7.9 | 54.7 | 7.8 |
| Examples 11 &22 | G/ZnO(32)/TiN(4)/ZnO(38)/TiN(4)/ZNO(28) | 0.2 | 74.0 | 10.0 | 54.8 | 9.5 |
| Com. Ex. 1 | No Film | | 87.5 | 8.5 | 68.1 | 5.7 |
| Com. Ex. 2 | G/ZnO(25)/Ag(12)/ZnO(45) | $7 \times 10^{-6}$ | 74.8 | 14.1 | 52.0 | 27.5 |

TABLE 3

| | Near Infrared Region Wavelength Transmittances | | | | |
|---|---|---|---|---|---|
| | 800 (nm) | 850 (nm) | 900 (nm) | 950 (nm) | 1000 (nm) |
| Examples 1 &12 | 78.0 | 78.3 | 78.5 | 79.0 | 79.1 |
| Examples 2 &13 | 77.9 | 78.2 | 78.5 | 78.8 | 78.8 |
| Examples 3 &14 | 80.7 | 81.5 | 82.4 | 83.2 | 83.9 |
| Examples 4 &15 | 71.8 | 71.3 | 69.9 | 69.1 | 68.2 |
| Examples 5 &16 | 71.2 | 70.8 | 69.4 | 68.7 | 67.9 |
| Com. Ex. 1 | 95.1 | 95.0 | 94.8 | 95.0 | 94.8 |

Transmittances of near infrared region (wavelength range: 800-1,000 nm), which has a relatively high energy in the solar radiation, of the infrared ray reflective films used in Examples 1-5 and of Comparative Example 1 are shown in Table 3. Comparative Example 1 shows the infrared region transmittance by only the interlayer film, on which an infrared ray reflective film is not formed, and in which functional ultra-fine particles of ITO are dispersed. The infrared ray reflective films used in Examples 1-5 lower the near infrared region transmittance, which cannot be achieved by only the interlayer film having functional ultra-fine particles dispersed therein. Therefore, there was obtained by the present invention a laminated glass having a heat-ray shielding capability and a radio wave transmitting capability, which cannot achieved by only an interlayer film having functional ultra-fine particles dispersed therein.

The invention claimed is:

1. A laminated glass having an interlayer film between at least two transparent glass platy bodies, wherein:
   functional ultra-fine particles of a particle diameter of not greater than 0.2 μm are dispersed in the interlayer film,
   the functional ultra-fine particles comprise a single substance of metal, metal oxide, metal nitride, metal sulfide or Sb- or F-doped substance of Sn, Ti, Si, Zn, Zr, Fe, Al, Cr, Co, Ce, In, Ni, Ag, Cu, Pt, Mn, Ta, W, V or Mo, or a composite selected from at least two of these, or a mixture containing an organic resin substance in the single substance or composite, or a coated substance coated with the single substance or composite, or an antimony-doped tin oxide and/or tin-doped indium oxide,
   an infrared-reflective film that has a sheet resistivity ranging from 1 kΩ/□ to 10 GΩ/□ is formed on at least one surface of the interlayer film, and
   the infrared-reflective film is (a) a single layer made of CrO, NiCrO or a stainless steel oxide, or (b) a laminate of three layers having a first layer formed on the at least one surface of the interlayer film, a second layer formed on the first layer, and a third layer formed on the second layer, the first, second and third layers of the laminate respectively being (i) ZnO, a stainless steel and ZnO, (ii) ZnO, a stainless steel nitride and ZnO, (iii) ZnO, CrN and ZnO, (iv) SnO, CrN and SnO, (v) SiO, Si and SiO, (vi) $Si_3N_4$, TiO and TiN, or (vii) ZnO, TiN and ZnO.

2. A laminated glass having an interlayer film between at least two transparent glass platy bodies, wherein:

an infrared-reflective film that has a sheet resistivity ranging from 1 kΩ/☐ to 10 GΩ/☐ is formed on at least one transparent glass platy body constituting the laminated glass, functional ultra-fine particles of a particle diameter of not greater than 0.2 μm are dispersed in the interlayer film, wherein the functional ultra-fine particles comprise a single substance of metal, metal oxide, metal nitride, sulfide or Sb- or F-doped substance of Sn, Ti, Si, Zn, Zr, Fe, Al, Cr, Co, Ce, In, Ni, Ag, Cu, Pt, Mn, Ta, W, V or Mo, or a composite selected from at least two of these, or a mixture containing an organic resin substance in the single substance or composite, or a coated substance coated with the single substance or composite, or an antimony-doped tin oxide and/or tin-doped indium oxide, and the infrared-reflective film is (a) a single layer made of CrO, NiCrO or a stainless steel oxide, or (b) a laminate of three layers having a first layer formed on the at least one transparent glass platy body, a second layer formed on the first layer, and a third layer formed on the second layer, the first, second and third layers of the laminate respectively being (i) ZnO, a stainless steel and ZnO, (ii) ZnO, a stainless steel nitride and ZnO, (iii) ZnO, CrN and ZnO, (iv) SnO, CrN and SnO, (v) SiO, Si and SiO, (vi) TiN, TiO and $Si_3N_4$, or (vii) ZnO, TiN and ZnO.

3. A laminated glass having an interlayer film between at least two transparent glass platy bodies, wherein:

functional ultra-fine particles of a particle diameter of not greater than 0.2 μm are dispersed in the interlayer film, the functional ultra-fine particles comprise a single substance of metal, metal oxide, metal nitride, metal sulfide or Sb- or F-doped substance of Sn, Ti, Si, Zn, Zr, Fe, Al, Cr, Co, Ce, In, Ni, Ag, Cu, Pt, Mn, Ta, W, V or Mo, or a composite selected from at least two of these, or a mixture containing an organic resin substance in the single substance or composite, or a coated substance coated with the single substance or composite, or an antimony-doped tin oxide and/or tin-doped indium oxide, an infrared-reflective film that has a sheet resistivity ranging from 1 kΩ/☐ to 10 GΩ/☐ is formed on at least one surface of the interlayer film, and the infrared-reflective film is a laminate of five layers, (i) a first layer of the laminate being formed on the at least one surface of the interlayer film and being made of ZnO, (ii) a second layer of the laminate being formed on the first layer and being made of TiN, (iii) a third layer of the laminate being formed on the second layer and being made of ZnO, (iv) a fourth layer of the laminate being formed on the third layer and being made of TiN, and (v) a fifth layer of the laminate being formed on the fourth layer and being made of ZnO.

4. A laminated glass having an interlayer film between at least two transparent glass platy bodies, wherein:

an infrared-reflective film that has a sheet resistivity ranging from 1 kΩ/☐ to 10 GΩ/☐ is formed on at least one transparent glass platy body constituting the laminated glass, functional ultra-fine particles of a particle diameter of not greater than 0.2 μm are dispersed in the interlayer film, wherein the functional ultra-fine particles comprise a single substance of metal, metal oxide, metal nitride, sulfide or Sb- or F-doped substance of Sn, Ti, Si, Zn, Zr, Fe, Al, Cr, Co, Ce, In, Ni, Ag, Cu, Pt, Mn, Ta, W, V or Mo, or a composite selected from at least two of these, or a mixture containing an organic resin substance in the single substance or composite, or a coated substance coated with the single substance or composite, or an antimony-doped tin oxide and/or tin-doped indium oxide, and the infrared-reflective film is a laminate of five layers, (i) a first layer of the laminate being formed on the at least one transparent glass platy body and being made of ZnO, (ii) a second layer of the laminate being formed on the first layer and being made of TiN, (iii) a third layer of the laminate being formed on the second layer and being made of ZnO, (iv) a fourth layer of the laminate being formed on the third layer and being made of TiN, and (v) a fifth layer of the laminate being formed on the fourth layer and being made of ZnO.

* * * * *